United States Patent
West et al.

(10) Patent No.: US 9,654,049 B2
(45) Date of Patent: May 16, 2017

(54) VARIABLE FREQUENCY DRIVE ACTIVE HARMONIC MITIGATION CONTROLS AND DIAGNOSTICS

(71) Applicant: Trane International Inc., Piscataway, NJ (US)

(72) Inventors: Nathan Thomas West, Holmen, WI (US); Benjamin James Sykora, LaCrosse, WI (US); David Marshall Foye, Pasadena, CA (US); Korwin Jay Anderson, Rochester, MN (US); William James Walters, Rochester, MN (US)

(73) Assignee: Trane International, Inc., Piscataway, NJ (US)

( * ) Notice: Subject to any disclaimer, the term of this patent is extended or adjusted under 35 U.S.C. 154(b) by 0 days.

(21) Appl. No.: 14/806,055

(22) Filed: Jul. 22, 2015

(65) Prior Publication Data

US 2015/0333668 A1     Nov. 19, 2015

Related U.S. Application Data

(63) Continuation of application No. PCT/US2014/012431, filed on Jan. 22, 2014.
(Continued)

(51) Int. Cl.
*G05B 11/01* (2006.01)
*H02P 29/50* (2016.01)
*H02P 6/00* (2016.01)

(52) U.S. Cl.
CPC .............. *H02P 29/50* (2016.02); *H02P 6/002* (2013.01)

(58) Field of Classification Search
CPC ............................ G05D 3/1418; G05B 19/404
(Continued)

(56) References Cited

U.S. PATENT DOCUMENTS

| 6,566,764 B2 * | 5/2003 | Rebsdorf | ............... | F03D 9/003 |
| | | | | 290/44 |
| 7,027,279 B2 * | 4/2006 | Levin | ....................... | H02J 3/01 |
| | | | | 361/113 |

(Continued)

FOREIGN PATENT DOCUMENTS

| EP | 2034605 | 8/2006 |
| EP | 2667503 A1 | 11/2013 |

(Continued)

OTHER PUBLICATIONS

Korean Patent Office, International Search Report and Written Opinion, PCT/US2014/012431, Trane International Inc., Apr. 28, 2014, 9 pgs.

(Continued)

*Primary Examiner* — Rina Duda
(74) *Attorney, Agent, or Firm* — Taft Stettinius & Hollister LLP

(57) ABSTRACT

Variable frequency drive active harmonic mitigation controls and diagnostics are disclosed. Exemplary controls and diagnostics include operating a variable frequency drive including converting an AC input line voltage to a DC voltage, generating a motor drive signal using the DC voltage, and driving an electric motor with the motor drive signal. A harmonic mitigation signal is provided to the drive configured to at least partially mitigate harmonics during the operation of the drive. The harmonic mitigation signal is inhibited based upon presence of an error condition associated with the drive input. The inhibiting is terminated based upon the absence of the error condition. A diagnostic fault (Continued)

condition based upon a number of occurrences of the error condition.

30 Claims, 5 Drawing Sheets

Related U.S. Application Data

(60) Provisional application No. 61/775,197, filed on Jan. 22, 2013.

(58) Field of Classification Search
USPC .................................... 318/629, 632
See application file for complete search history.

(56) References Cited

U.S. PATENT DOCUMENTS

| | | |
|---|---|---|
| 7,786,691 B2 | 8/2010 | Garlow et al. |
| 8,156,757 B2* | 4/2012 | Doty .................. F04D 25/0606 417/372 |
| 2008/0115527 A1* | 5/2008 | Doty .................. F04D 25/0606 62/498 |
| 2012/0001586 A1 | 1/2012 | Maruyama et al. |
| 2012/0294053 A1 | 11/2012 | Yan et al. |
| 2013/0119769 A1* | 5/2013 | Johnson .................. H02J 3/38 307/68 |

FOREIGN PATENT DOCUMENTS

| | | |
|---|---|---|
| JP | 10-014253 | 1/1998 |
| JP | 2006296114 | 10/2006 |
| JP | 2012105440 | 5/2012 |
| WO | 2011107773 | 9/2011 |
| WO | 2012098875 A1 | 7/2012 |

OTHER PUBLICATIONS

Extended European Search Report; European Patent Office; European Application No. 14743944.2; Feb. 24, 2016; 9 pages.

* cited by examiner

VARIABLE FREQUENCY DRIVE ACTIVE HARMONIC MITIGATION CONTROLS AND DIAGNOSTICS

BACKGROUND

Variable frequency drives offer a number of potential advantages for heating, ventilation, air conditioning, or refrigeration (HVACR) applications including opportunities for enhanced efficiency, control, and performance. Yet they also pose a number of design challenges including the need to mitigate harmonic losses due to power line input harmonic currents and/or terminal voltages. Various techniques have been proposed to mitigate harmonics including link chokes, line reactors, multiphase techniques, harmonic filters, and combinations of these and other techniques. Active harmonic attenuation, cancellation or damping techniques may also be used to mitigate harmonics. These and other active harmonic mitigation ("AHM") techniques generally utilize controls which analyze a given drive signal for the presence and characteristics of harmonic distortion and generate a mitigation command or signal configured to provide desired attenuation, cancellation or damping to produce a desired corrected drive signal, for example, to produce a more precise synthesized approximation of a sinusoid, or to mitigate harmonic feedback to the input or output of a variable frequency drive. They may be implemented alone or in combination with other techniques. While AHM techniques offer a number of potential benefits, they also present a number of unanticipated challenges and problems with respect to HVACR applications. Various duty cycle requirements of HVACR applications can give rise to control states that, while desirable from a harmonic mitigation perspective, have the potential to damage the system. These issues may be of particular interest in applications utilizing permanent magnet motors though they are broadly applicable to other systems as well. There is a significant need for the unique and inventive apparatuses, methods and systems disclosed herein.

DISCLOSURE

For the purposes clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall be understood that no limitation of the scope of the invention is thereby created, and that the invention includes and protects such alterations, modifications, and further applications of the exemplary embodiments as would occur to one skilled in the art to which the invention relates.

SUMMARY

Apparatuses, methods and systems for control and diagnostics of variable frequency drive active harmonic mitigation are disclosed. Exemplary controls and diagnostics include operating a variable frequency drive which converts an AC input line voltage to a DC voltage, generates a motor drive signal using the DC voltage, and drives an electric motor with the motor drive signal. A harmonic mitigation signal is provided to the drive and is configured to at least partially mitigate harmonics during the operation of the drive. The harmonic mitigation signal is inhibited based upon presence of an error condition associated with the drive input. The inhibiting is terminated based upon the absence of the error condition. A diagnostic fault condition is based upon a number of occurrences of the error condition. Further embodiments, forms, objects, features, advantages, aspects, and benefits shall become apparent from the following description and drawings.

DETAILED DESCRIPTION

Figure 1:
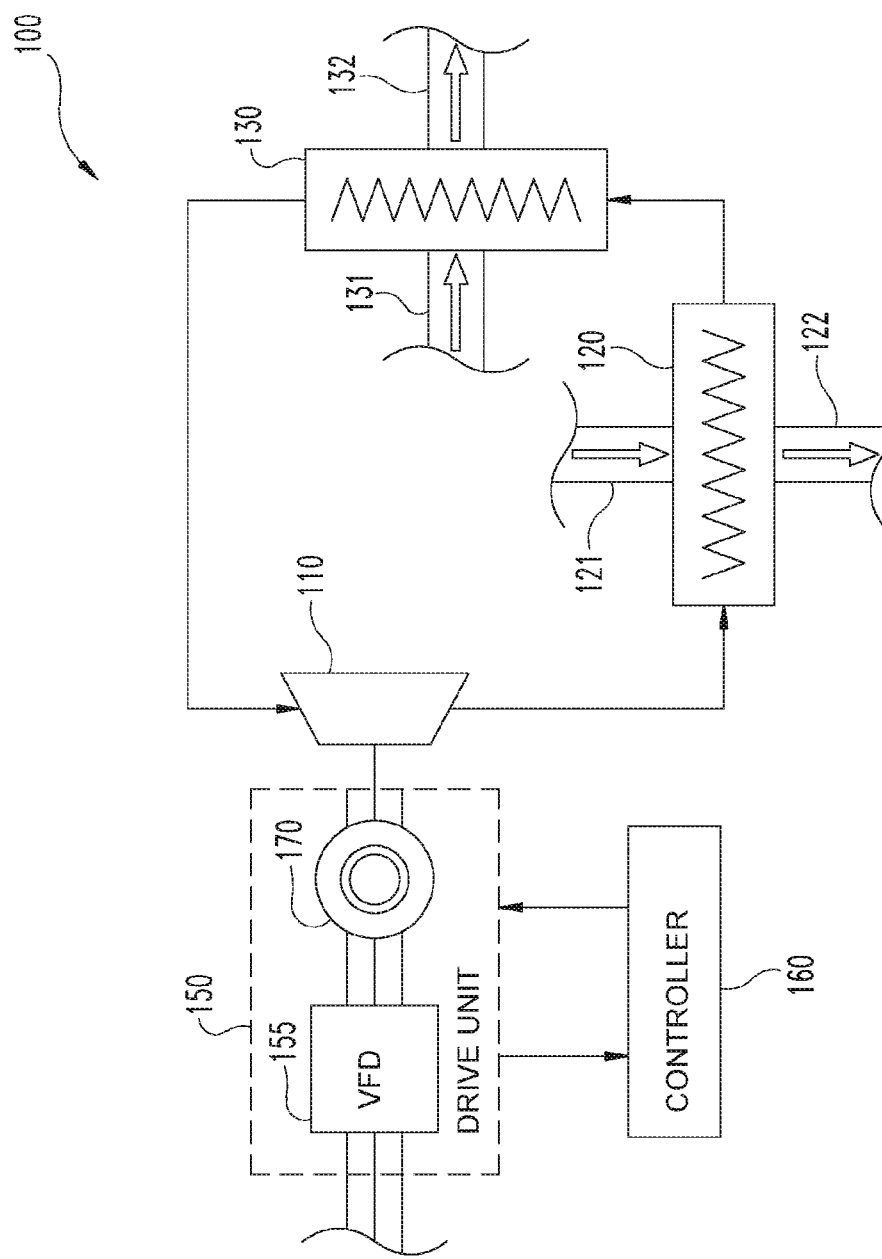
FIG. 1 is a schematic of an exemplary HVACR system.

With reference to FIG. 1 there is illustrated an exemplary HVACR system 100 which includes a refrigerant loop comprising a compressor 110, a condenser 120, and an evaporator 130. Refrigerant flows through system 100 in a closed loop from compressor 110 to condenser 120 to evaporator 130 and back to compressor 110. Various embodiments may also include additional refrigerant loop elements including, for example, valves for controlling refrigerant flow, refrigerant filters, economizers, oil separators and/or cooling components and flow paths for various system components.

Compressor 110 is driven by a drive unit 150 including a permanent magnet electric motor 170 which is driven by a variable frequency drive 155. In the illustrated embodiment, variable frequency drive 155 is configured to output a three-phase PWM drive signal, and motor 170 is a surface magnet permanent magnet motor. Use of other types and configurations of variable frequency drives and permanent magnet electric motors such as interior magnet permanent magnet motors are also contemplated. It shall be appreciated that the principles and techniques disclosed herein may be applied to a broad variety of drive and motor configurations including inductance motor systems, reluctance motor systems and other motor systems.

Condenser 120 is configured to transfer heat from compressed refrigerant received from compressor 110. In the illustrated embodiment condenser 120 is a water cooled condenser which receives cooling water at an inlet 121, transfers heat from the refrigerant to the cooling water, and outputs cooling water at an output 122. It is also contemplated that other types of condensers may be utilized, for example, air cooled condensers or evaporative condensers. It shall further be appreciated that references herein to water include water solutions comprising additional constituents unless otherwise limited.

Evaporator 130 is configured to receive refrigerant from condenser 120, expand the received refrigerant to decrease its temperature and transfer heat from a cooled medium to the refrigerant. In the illustrated embodiment evaporator 130 is configured as a water chiller which receives water provided to an inlet 131, transfers heat from the water to the refrigerant, and outputs chilled water at an outlet 132. It is contemplated that a number of particular types of evaporators and chiller systems may be utilized, including dry expansion evaporators, flooded type evaporators, bare tube evaporators, plate surface evaporators, and finned evaporators among others.

HVACR system 100 further includes a controller 160 which outputs control signals to variable frequency drive 155 to control operation of the motor 170 and compressor 110. Controller 160 also receives information about the operation of drive unit 150. In exemplary embodiments controller 160 receives information relating to motor current, motor terminal voltage, and/or other operational characteristics of the motor including those described herein below. It shall be appreciated that the controls, control routines, and control modules described herein may be implemented using hardware, software, firmware and various combinations thereof and may utilize executable instructions stored in a non-transitory computer readable medium or multiple non-transitory computer readable media. It shall further be understood that controller 160 may be provided in various forms and may include a number of hardware and software modules and components such as those disclosed herein. Furthermore, it shall be appreciated that controller 160 is one example of a controller which may be configured to implement the exemplary controls and diagnostics disclosed herein, in whole or in part in combination with other systems, modules or components.

Figure 2:
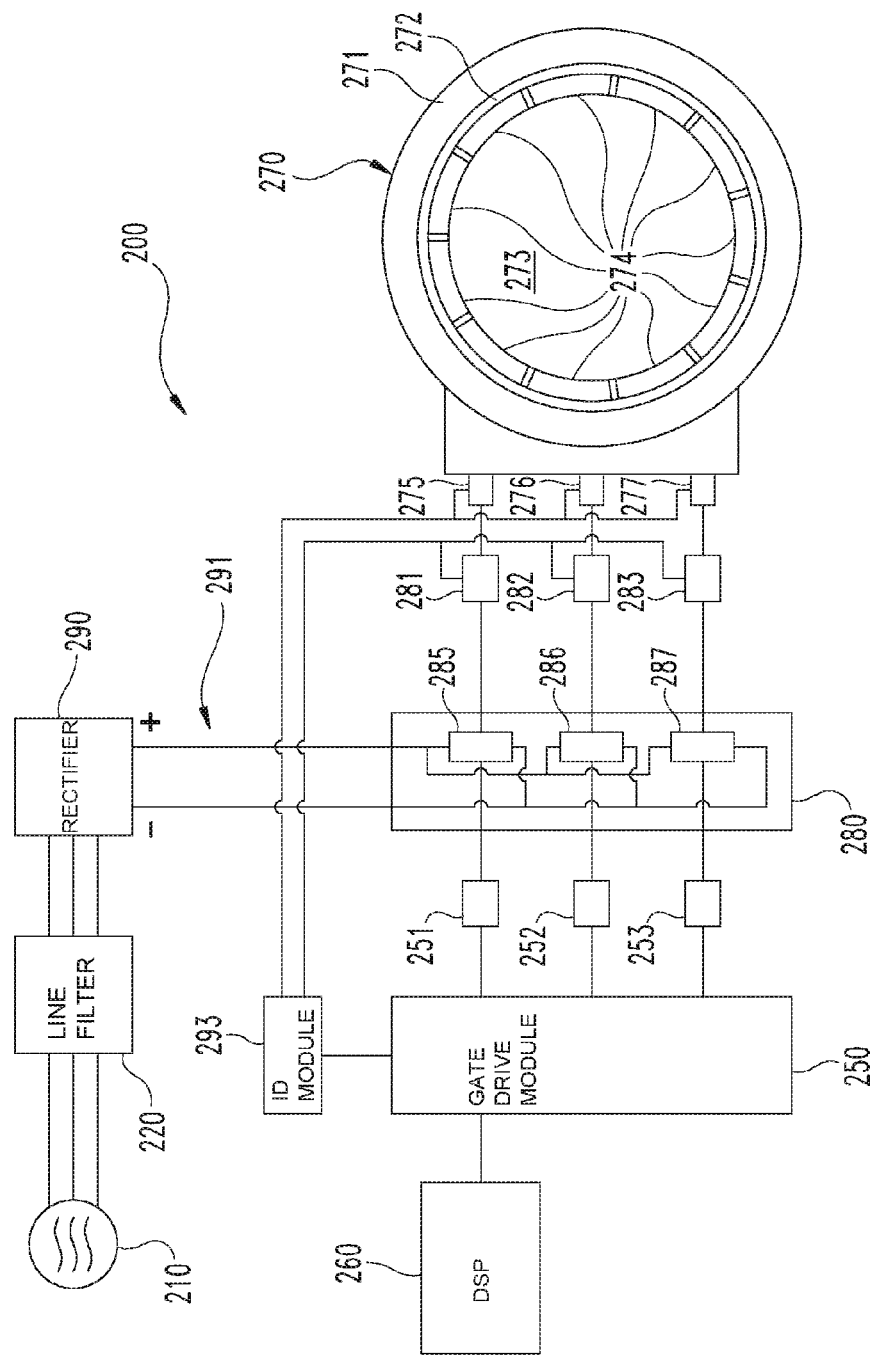
FIG. 2 is a schematic of an exemplary variable frequency drive and permanent magnet motor.

With reference to FIG. 2 there is illustrated an exemplary circuit diagram for a variable frequency drive 200. Drive 200 is connected to a power source 210, for example, a 400/480 VAC utility power supply which provides three-phase AC power to line filter module 220. Line filter module 220 is configured to provide a sync signal and serve as an RF filter. Three-phase AC power is then provided to a rectifier 290 which converts the AC power to DC power and provides the DC power to a DC to bus 291. The DC bus is connected to inverter 280. For clarity of illustration and description, rectifier 290, DC bus 291, and inverter 280 are shown as discrete blocks. It shall be appreciated, however, that two or more of these components may be provided in a common module, board or board assembly which may also include a variety of additional circuitry and components. In addition to the illustrated 6-pulse configuration, it shall be further understood that multiple pulse rectifiers such as 12-pulse, 18-pulse, 24-pulse or 30-pulse rectifiers may be utilized along with phase shifting transformers providing appropriate phase inputs for 6-pulse 12-pulse, 18-pulse, 24-pulse, or 30-pulse operation.

Inverter module 280 includes switches 285, 286 and 287 which are connected to the positive and negative lines of the DC bus 291. Switches 285, 286 and 287 are preferably configured as IGBT and diode based switches, but may also utilize other types of power electronics switching components such as power MOSFETs or other electrical switching devices. Switches 285, 286 and 287 provide output to motor terminals 275, 276 and 277. Current sensors 281, 282 and 283 are configured to detect current flowing from inverter module 280 to motor 270 and send current information to ID module 293. Voltage sensors are also operatively coupled with motor terminals 275, 276 and 277 and configured to provide voltage information from the motor terminals to ID module 293.

ID module 293 includes burden resistors used in connection with current sensing to set the scaling on current signals ultimately provided to analog to digital converters for further processing. ID module 293 tells the VFD what size it is (i.e. what type of scaling to use on current post ADC) using identification bits which are set in hardware on the ID module 293. ID module 293 also outputs current and voltage information to gate drive module 250 and also provides identification information to gate drive module 250 which identifies the type and size of the load to which gate drive module 250 is connected. ID module 293 may also provide current sensing power supply status information to gate drive module 250. ID module 293 may also provide scaling functionality for other parameters such as voltage or flux signals in other embodiments.

Gate drive module 250 provides sensed current and voltage information to analog to digital converter inputs of DSP module 260. DSP module 260 processes the sensed current and voltage information and also provides control signals to gate drive module 250 which control signals gate drive module 250 to output voltages to boost modules 251, 252 and 253, which in turn output boosted voltages to switches 285, 286 and 287. The signals provided to switches 285, 286 and 287 in turn control the output provided to terminals 275, 276 and 277 of motor 270. It shall be appreciated that DSP module 260 is one example of a controller which may be configured to implement the exemplary controls and diagnostics disclosed herein, in whole or in part in combination with other systems, modules or components.

Motor 270 includes a stator 271, a rotor 273, and an air gap 272 between the rotor and the stator. Motor terminals 275, 276 and 277 are connected to windings provided in stator 271. Rotor 273 includes a plurality of permanent magnets 274. In the illustrated embodiment magnets 274 are configured as surface permanent magnets positioned about the circumference of rotor 273. The rotor is typically constructed using the permanent magnets in such a way as essentially a constant magnetic flux is present at the surface of the rotor. In operation with rotation of the rotor, the electrical conductors forming the windings in the stator are disposed to produce a sinusoidal flux linkage. Other embodiments also contemplate the use of other magnet configurations such as interior magnet configurations. It shall be understood that interior magnet configurations typically have different inductances in the q-axis and the d-axis.

Figure 3:
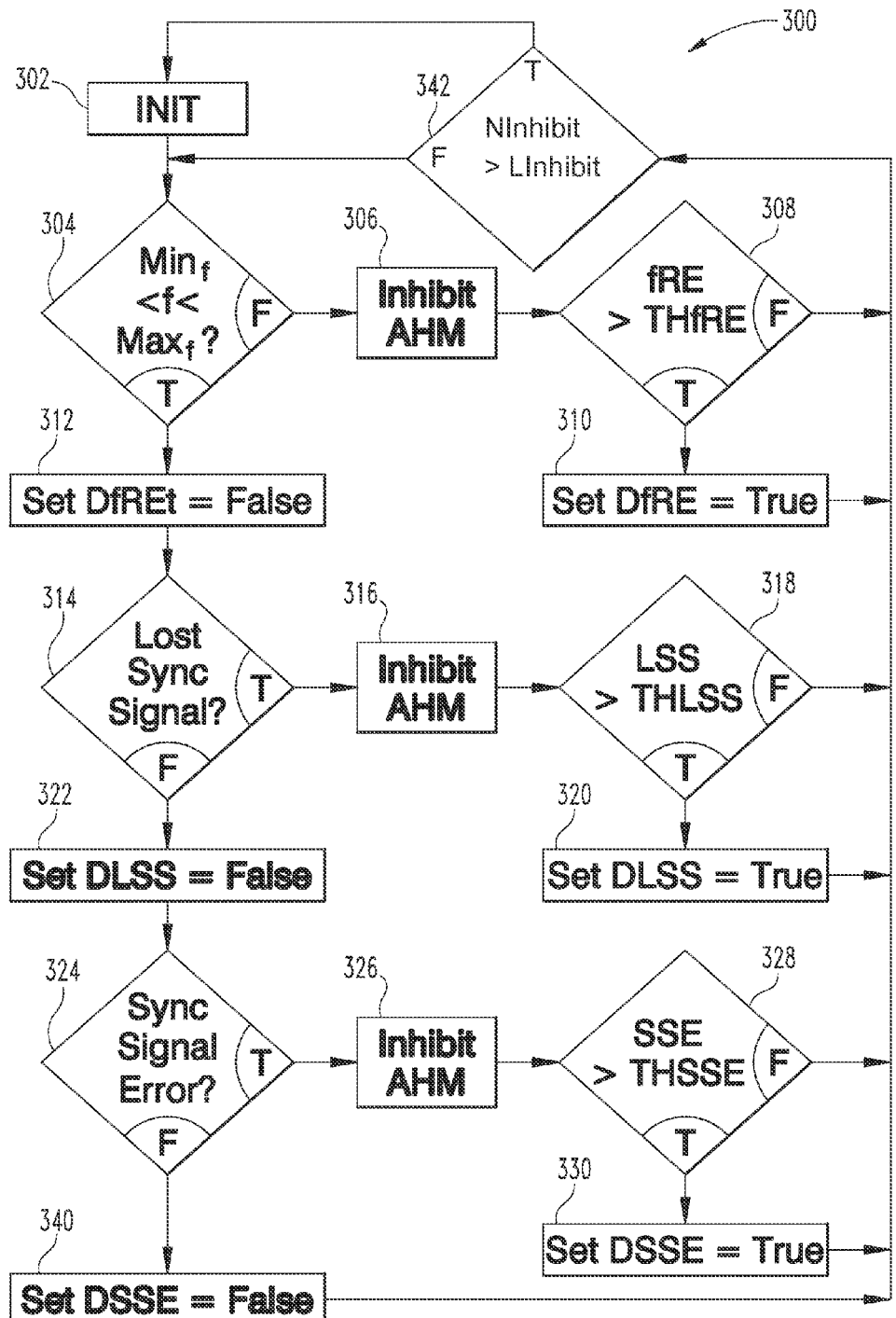
FIGS. 3 and 4 are flow diagrams illustrating exemplary control and diagnostic processes.

With reference to FIG. 3 there is illustrated a flow diagram of an exemplary control and diagnostic process 300. Process 300 begins at operation 302 which initializes an active harmonic mitigation ("AHM") control process which is configured and executable to mitigate power line input harmonic currents and/or terminal voltages. From operation 302 process 300 proceeds to conditional 304 which evaluates whether a frequency F, such as the drive input line frequency, is above a minimum frequency MinF and below a maximum frequency MaxF. If conditional 304 returns false, process 300 proceeds to operation 306 which inhibits the AHM process. From operation 306 process 300 proceeds to operation 308 which tests whether a frequency range error FRE is greater than a threshold for frequency range errors THFRE. If conditional 308 returns false, process 300 proceeds to conditional 342. If conditional 308 returns true, process 300 proceeds to operation 310 which sets a diagnostic fault DFRE equal to true and proceeds to conditional 342. Conditional 342 tests whether the number of inhibit operations is greater than a limit on the number of inhibit operations Linhibit. If conditional 342 returns true, process 300 proceeds to operation 302 which reinitializes the AHM process or sends a signal indicating that a manual reset is needed. If conditional 342 returns false, process 300 returns to conditional 304. If conditional 304 returns true, process 300 proceeds to operation 312 which sets diagnostic DFRET equal to false. From operation 312 process 300 proceeds to operation 314 which tests for a lost sync signal condition. If conditional 314 returns true, process 300 proceeds to operation 316 which inhibits the AHM process. From operation 316 process 300 proceeds to conditional 318 which tests whether the number of sync signal errors SSE is greater than a threshold THSSE. If conditional 328 returns false, process 300 proceeds to conditional 342. If conditional 328 returns true, process 300 proceeds to operation 330 which sets diagnostic fault code DSSE equal to true. From operation 330 process 300 proceeds to conditional 342. If conditional 342 returns false, process 300 proceeds to operation 340 which sets diagnostic fault code DSSE equal false. From operation 340 process 300 proceeds to conditional 342.

Figure 4:
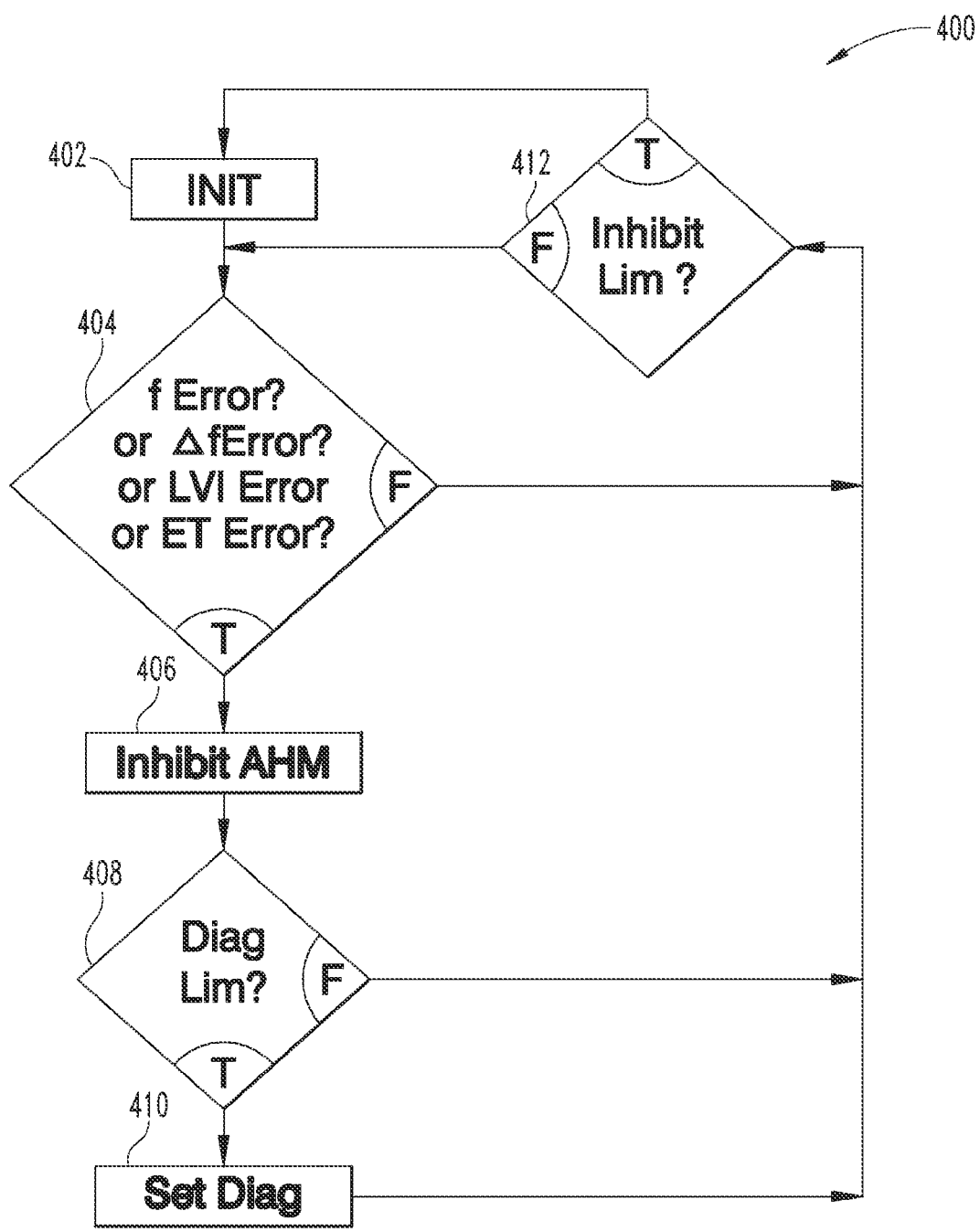

With reference to FIG. 4 there is illustrated a flow diagram according to an exemplary control and diagnostic process 400. Process 400 begins at operation 402 which initializes an AHM process. From operation 402, process 400 proceeds to conditional 404. Conditional 404 tests for a frequency error, a delta frequency error, a line voltage imbalance error, and/or an short term electrical disturbance error, such as an electrical transient, a voltage surge, a ring wave, an electrical fast transient burst, an RF conducted immunity, a voltage variation, a voltage dip, a voltage interruption, or a voltage notch among others. If conditional 404 returns false, process 400 proceeds to conditional 412. If conditional 404 returns true, process 400 proceeds to operation 406 which inhibits the AHM process. From operation 406 process 400 proceeds to operation 408 which tests whether a diagnostic limit has been reached for the frequency error, the delta frequency error, the line voltage imbalance error, and/or the electrical transient error. If operation 408 returns false, process 400 proceeds to conditional 412. If conditional 408 returns true, process 400 proceeds to operation 410 which sets a diagnostic fault code. From operation 410 process 400 proceeds to conditional 412. Conditional 412 tests whether a limit on the number of inhibit operations has been reached. If conditional 412 returns true, process 400 returns to operation 402 which reinitializes the AHM process or sends a signal that a manual reset is needed. If conditional 412 returns false, process 400 returns to conditional 404.

Figure 5:
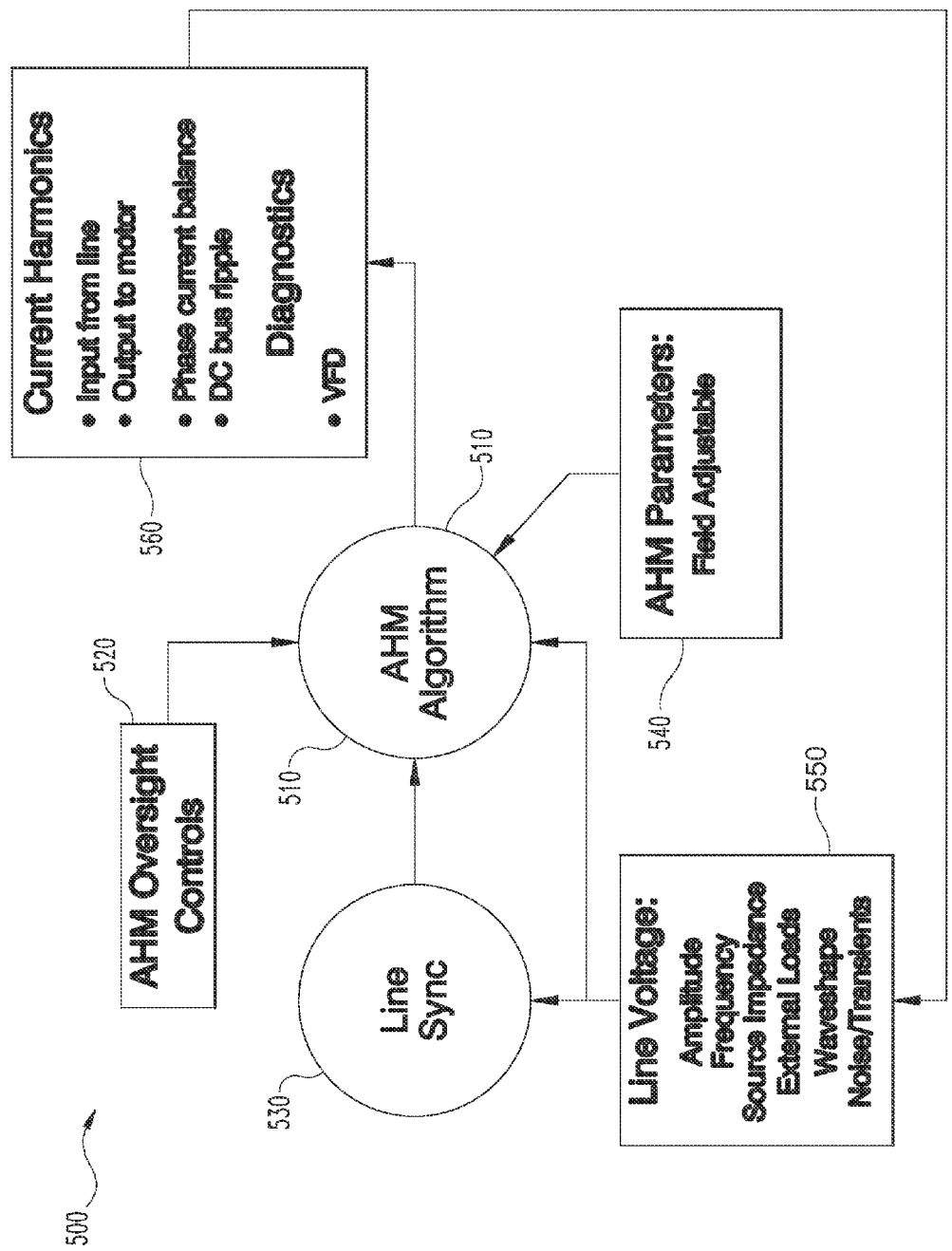
FIG. 5 is a block diagram illustrating exemplary controls and diagnostics.

With reference to FIG. 5 there is illustrated a block diagram of exemplary AHM controls 500. Block 550 illustrates the inputs that are provided to line sync algorithm 530 and AHM algorithm 510 which include the amplitude, frequency, source impedance, external loads, waveshapes, noise and transients of the input line voltage provided to a variable frequency drive. Line synch algorithm 530 utilizes the input information to provide synchronization information, for example, information indicating phase angle of an input line, to AHM algorithm 510. AHM algorithm 510 also receives input from AHM oversight controls 520 and field adjustable AHM parameters 540. AHM algorithm 510 utilizes the inputs it receives to provide a signal configured to mitigate current or voltage harmonics input from the line and/or current or voltage harmonics output to the motor, provide phase current balance, and provide a desired amount of DC bus ripple. AHM algorithm 510 also outputs diagnostic information relating to the variable frequency drive and/or the overall system in which the drive is implemented.

AHM oversight controls 520 may implement a number of AHM inhibit criteria which inhibit, turn off, or suspend AHM functionality, and a number of AHM diagnostic criteria which set a diagnostic fault code and/or reset the AHM algorithm or the system in which it is implemented. Certain embodiments utilize the criteria listed in Table 1 below.

TABLE 1

| Error Condition | Inhibit Threshold | Inhibit Reset | Diagnostic Threshold | Diagnostic Reset |
|---|---|---|---|---|
| Frequency out of range | Frequency <47 Hz or >63 Hz for any period of time | Frequency returns to within 47-63 Hz | Frequency <47 Hz or >63 Hz for 1 minute | Frequency returns to within 47-63 Hz |
| Loss of AHM sync signal | No valid signal for N consecutive open windows | valid signal transitions | No valid signal transitions in open portion of window function for 1 minute | valid signal transitions |
| AHM sync signal error | Noise limit of M contiguous bits outside of valid window | M contiguous bits in valid window | >60 seconds bit outside of valid window. | 3 contiguous bits in valid window |
| Excessive AHM inhibit | n/a | n/a | 3 inhibits in one minute or 10 inhibits in 1 hour | DSP initialize or manual reset |

In Table 1 above, the frequency out of range condition may be determined with through evaluation of the line sync signal. The loss of AHM sync signal may occur over one cycle, one-half cycle, or other numbers of cycles or open windows. AHM sync signal errors may be determined based upon an evaluation of zero crossing events where a M zero crossing events, for example two zero crossing events, are expected per cycle and extra zero crossing events indicate an error state. The evaluation may include monitoring at time=$\frac{1}{2} * \frac{1}{63}$ to $\frac{1}{2} * \frac{1}{47}$ and determining that unexpected zero crossing events have occurred within this time frame.

Certain embodiments utilize additional or alternate criteria for AHM oversight controls 520. Some embodiments criteria suspend, turn off or inhibit AHM functionality based upon the presence or detection of short term electrical disturbances, line voltage imbalance, incoming line frequency, and/or incoming line frequency rate of change. The short term electrical disturbances may include an electrical transient, a voltage surge, a ring wave, an electrical fast transient burst, an RF conducted immunity, a voltage variation, a voltage dip, a voltage interruption, and a voltage notch among others.

Field adjustable AHM parameters 540 may include a number of calibratibles which may be utilized in controlling AHM functionality. Exemplary calibratibles include on/off enable/disable calibratibles, gain settings for current regulators and other routines or devices, current injection limits, and calibratibles specifying one or more harmonics to be targeted for mitigation, among others.

AHM algorithm outputs 560 may include signals or commands configured to mitigate one or more input line harmonics such as input line harmonics and/or one or more output harmonics. Outputs 560 may also include signals or commands configured to enhance phase current balance and/or mitigate DC bus ripple. Outputs 560 further include diagnostics as to the state of the variable frequency drive such as those disclosed herein. Outputs 560 feed back to or influence inputs 550 in a closed loop fashion, though it shall be understood that open loop controls and diagnostics may also be utilized.

It shall be understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating a variable frequency drive including converting an AC input line voltage to a DC voltage, generating a motor drive signal using the DC voltage, and driving an electric motor with the motor drive signal;
   providing a harmonic mitigation signal from a controller to the drive configured to at least to partially mitigate harmonics during the operation of the drive;
   inhibiting the harmonic mitigation signal based upon detection by the controller of an error condition associated with the AC input line voltage;
   terminating the inhibiting based upon detection by the controller of an absence of the error condition; and
   setting a diagnostic fault condition based upon a number of occurrences of the error condition.

2. A method according to claim 1 wherein the error condition comprises an AC input line frequency error condition and an AC input line synchronization error condition.

3. A method according to claim 2 wherein the AC input line frequency error condition comprises a frequency of the AC input line being below a minimum or above a maximum.

4. A method according to claim 2 wherein the AC input line frequency error condition comprises a rate of change of the AC input line frequency exceeding a threshold.

5. A method according to claim 1 wherein the error condition comprises one or more of a frequency of the AC input line being below a minimum or above a maximum and a rate of change of the frequency of the AC input line exceeding a threshold.

6. A method according to claim 2 wherein the synchronization error condition comprises loss of a synchronization signal.

7. A method according to claim 2 wherein the synchronization error condition comprises absence of a valid synchronization signal for at least a predetermined time.

8. A method according to claim 2 wherein the synchronization error condition comprises presence of synchronization signal noise above a predetermined threshold.

9. A method according to claim 1 wherein the motor is a permanent magnet motor.

10. A method according to claim 1 wherein the act of providing a harmonic mitigation signal comprises injecting current to mitigate one or more harmonics.

11. A system comprising:
    a variable frequency drive including a rectifier electrically coupled with an AC input line, a DC link electrically coupled with the rectifier, and an inverter electrically coupled with the DC link;
    a motor operatively coupled with an output of the variable frequency drive, the motor configured to drive an HVACR load; and
    a controller electrically coupled with the drive, the controller being configured to mitigate harmonics during operation of the drive by controlling at least one of a drive current and a drive voltage, evaluate the AC input line for an input line error condition, suspend harmonic mitigation based upon presence of the input line error condition, and resume harmonic mitigation based upon absence of the input line error condition.

12. A system according to claim 11 wherein the controller is further configured to set a diagnostic fault based upon a number of instances of suspended harmonic mitigation.

13. A system according to claim 11 wherein the controller is further configured to limit harmonic mitigation based upon a current control limit or a voltage control limit.

14. A system according to claim 11 wherein the input line error condition is indicative of short term electrical disturbance condition of the input line.

15. A system according to claim 14 wherein the short term electrical disturbance condition comprises one or more of an electrical transient, a surge, a ring wave, an electrical fast transient burst, an RF conducted immunity, a voltage variation, a voltage dip, a voltage interruption, and a voltage notch.

16. A system according to claim 11 wherein the input line error condition is indicative of a line voltage imbalance condition.

17. A system according to claim 16 wherein the line voltage imbalance condition comprises an imbalance between 2% and 3%.

18. A system according to claim 11 wherein the input line error condition is indicative of an input line frequency less than a minimum value or greater than a maximum value.

19. A system according to claim 11 wherein the input line error condition is indicative of a rate of change of input line frequency greater than a maximum value.

20. A system according to claim 11 wherein the input line error condition is indicative of any of an electrical transient, an input line voltage imbalance, an incoming line frequency out of range condition, and an over limit input line frequency rate of change.

21. An apparatus comprising:
    a variable frequency drive; and
    a controller configured to control the variable frequency drive;
    wherein the controller is configured to:
    operate the variable frequency drive to output a drive signal,
    at least partially actively mitigate harmonics of the drive during the operation of the drive,
    suspend the harmonic mitigation based upon the controller detecting a presence of an error condition associated with an input received by the drive,
    resume the harmonic mitigation based upon the controller detecting an absence of the error condition, and
    identify a fault condition based upon a number of occurrences of the suspension.

22. An apparatus according to claim 21 further comprising an electric motor electrically coupled with the output of the variable frequency drive.

23. An apparatus according to claim 22 further comprising an HVACR load drivingly coupled with electric motor.

24. An apparatus according to claim 23 wherein the HVACR load is a refrigerant compressor.

25. An apparatus according to claim 23 wherein the motor is a permanent magnet motor.

26. An apparatus according to claim 21 wherein the controller is further configured to reset or shut down the variable frequency drive based upon the fault condition.

27. An apparatus according to claim 21 wherein the error condition comprises a magnitude of the input to the drive meeting a predetermined condition.

28. An apparatus according to claim 21 wherein the error condition comprises a frequency of the input to the drive meeting a predetermined condition.

29. An apparatus according to claim 21 wherein the error condition is determined based upon one or more of an electrical transient, a voltage surge, a ring wave, an electrical fast transient burst, an RF conducted immunity, a voltage variation, a voltage dip, a voltage interruption, and a voltage notch.

30. An apparatus according to claim 21 wherein the mitigated harmonics comprise power line input harmonic currents or terminal voltages.

* * * * *